(12) United States Patent  (10) Patent No.: US 8,469,272 B2
Kearney (45) Date of Patent: Jun. 25, 2013

(54) HYBRID-TYPE BIOPTICAL LASER SCANNING AND IMAGING SYSTEM SUPPORTING DIGITAL-IMAGING BASED BAR CODE SYMBOL READING AT THE SURFACE OF A LASER SCANNING WINDOW

(75) Inventor: Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 0 days.

(21) Appl. No.: 13/074,123

(22) Filed: Mar. 29, 2011

(65) Prior Publication Data

US 2012/0248188 A1 Oct. 4, 2012

(51) Int. Cl.
*G06K 7/00* (2006.01)

(52) U.S. Cl.
USPC .......................................... 235/440; 235/454

(58) Field of Classification Search
USPC ............................... 235/440, 462.01–45, 454
See application file for complete search history.

(56) References Cited

U.S. PATENT DOCUMENTS

| | | | |
|---|---|---|---|
| 974,083 A | 10/1910 | Likewise | |
| 4,652,732 A | 3/1987 | Nickl | |
| 6,758,402 B1 | 7/2004 | Check et al. | |
| 6,814,292 B2 | 11/2004 | Good | |
| 6,918,540 B2 | 7/2005 | Good | |
| 6,951,304 B2 | 10/2005 | Good | |
| 6,974,083 B1 | 12/2005 | Kahn et al. | |
| 6,991,167 B2 | 1/2006 | Check et al. | |
| 6,991,169 B2 * | 1/2006 | Bobba et al. | 235/462.39 |
| 7,051,922 B2 | 5/2006 | Check et al. | |
| 7,083,092 B2 | 8/2006 | Nakamura | |
| 7,083,102 B2 | 8/2006 | Good et al. | |
| 7,086,597 B2 | 8/2006 | Good | |
| 7,103,203 B2 | 9/2006 | Deschamps | |
| 7,137,555 B2 | 11/2006 | Bremer et al. | |
| 7,152,795 B2 | 12/2006 | Tsikos et al. | |
| 7,159,770 B2 | 1/2007 | Onozu | |
| 7,191,947 B2 * | 3/2007 | Kahn et al. | 235/462.41 |
| 7,246,747 B2 | 7/2007 | Bremer et al. | |
| 7,293,711 B2 | 11/2007 | Brock | |
| 7,296,748 B2 * | 11/2007 | Good | 235/462.14 |
| 7,303,131 B2 * | 12/2007 | Carlson et al. | 235/462.22 |
| 7,314,176 B2 | 1/2008 | Good | |
| 7,341,192 B2 | 3/2008 | Good | |
| 7,349,884 B1 | 3/2008 | Odom et al. | |
| 7,374,094 B2 | 5/2008 | Good | |
| 7,377,427 B2 | 5/2008 | Murata | |

(Continued)

FOREIGN PATENT DOCUMENTS

| | | |
|---|---|---|
| WO | 2012008987 A | 1/2012 |
| WO | 2012021296 A | 2/2012 |

*Primary Examiner* — Daniel St. Cyr
(74) *Attorney, Agent, or Firm* — Summa, Additon & Ashe, P.A.

(57) ABSTRACT

A hybrid-type bi-optical bar code symbol reading system having a vertical housing section having a vertical scanning window and a horizontal housing section having a horizontal scanning window, from which laser scanning planes are projected and intersect within a 3D scanning volume defined between the vertical and horizontal scanning windows. A digital imaging module is supported within the vertical section of the system housing and automatically projects a field of view (FOV) within the 3D scanning volume when an object is detected in close proximity to the vertical scanning window of the system, providing an automatically-triggered digital imaging region in close proximity to the vertical scanning window.

20 Claims, 9 Drawing Sheets

U.S. PATENT DOCUMENTS

| | | |
|---|---|---|
| 7,383,996 B2 | 6/2008 | Good et al. |
| 7,407,103 B2 | 8/2008 | Check et al. |
| 7,422,156 B2 | 9/2008 | Good |
| 7,461,780 B2 | 12/2008 | Potts et al. |
| 7,510,118 B2 | 3/2009 | Ralph et al. |
| 7,516,898 B2 * | 4/2009 | Knowles et al. ......... 235/462.42 |
| 7,527,203 B2 | 5/2009 | Bremer et al. |
| 7,527,204 B2 | 5/2009 | Knowles et al. |
| 7,533,819 B2 | 5/2009 | Barkan et al. |
| 7,533,820 B2 | 5/2009 | Knowles et al. |
| 7,537,165 B2 | 5/2009 | Knowles et al. |
| 7,540,422 B2 | 6/2009 | Knowles et al. |
| 7,540,424 B2 | 6/2009 | Knowles et al. |
| 7,546,952 B2 | 6/2009 | Knowles et al. |
| 7,546,953 B1 | 6/2009 | Collins, Jr. |
| 7,556,199 B2 | 7/2009 | Knowles et al. |
| 7,559,474 B2 | 7/2009 | Knowles et al. |
| 7,568,626 B2 | 8/2009 | Knowles et al. |
| 7,571,858 B2 | 8/2009 | Knowles et al. |
| 7,575,169 B2 | 8/2009 | Knowles et al. |
| 7,575,170 B2 | 8/2009 | Knowles et al. |
| 7,577,610 B2 | 8/2009 | Miyuki |
| 7,578,445 B2 | 8/2009 | Knowles et al. |
| 7,581,680 B2 | 9/2009 | Knowles et al. |
| 7,594,609 B2 | 9/2009 | Kotlarsky et al. |
| 7,611,062 B2 | 11/2009 | Knowles et al. |
| 7,614,560 B2 | 11/2009 | Knowles et al. |
| 7,637,432 B2 | 12/2009 | Kotlarsky et al. |
| 7,651,028 B2 | 1/2010 | Knowles et al. |
| 7,654,461 B2 | 2/2010 | Kotlarsky et al. |
| 7,658,330 B2 | 2/2010 | Knowles et al. |
| 7,661,595 B2 | 2/2010 | Knowles et al. |
| 7,673,802 B2 | 3/2010 | Knowles et al. |
| 7,686,216 B2 | 3/2010 | Walczyk et al. |
| 7,712,666 B2 | 5/2010 | Kotlarsky et al. |
| 7,757,955 B2 | 7/2010 | Barkan |
| 7,770,798 B2 | 8/2010 | Kotlarsky et al. |
| 7,775,436 B2 | 8/2010 | Knowles et al. |
| 7,787,309 B2 | 8/2010 | Liu |
| 7,789,309 B2 | 9/2010 | Kotlarsky et al. |
| 7,798,410 B2 | 9/2010 | Carlson et al. |
| 7,806,335 B2 | 10/2010 | Knowles et al. |
| 7,819,326 B2 | 10/2010 | Knowles et al. |
| 7,878,407 B2 | 2/2011 | Knowles et al. |
| 7,905,413 B2 | 3/2011 | Knowles et al. |
| 7,920,871 B2 | 4/2011 | Okuda |
| 7,950,583 B2 | 5/2011 | Kotlarsky et al. |
| 7,954,719 B2 | 6/2011 | Zhu et al. |
| 7,962,931 B2 | 6/2011 | Bova |
| 7,967,209 B2 | 6/2011 | Kotlarsky et al. |
| 8,025,216 B2 | 9/2011 | Potts et al. |
| 8,033,472 B2 | 10/2011 | Giebel et al. |
| 8,042,740 B2 | 10/2011 | Knowles et al. |
| 8,052,057 B2 | 11/2011 | Smith et al. |
| 8,126,195 B2 | 2/2012 | Landers, Jr. et al. |
| 8,157,174 B2 | 4/2012 | Kotlarsky et al. |
| 2004/0000591 A1 | 1/2004 | Collins et al. |
| 2004/0217175 A1 | 11/2004 | Bobba et al. |
| 2005/0072605 A1 | 4/2005 | Kunzi et al. |
| 2005/0098634 A1 | 5/2005 | Good |
| 2007/0063045 A1 | 3/2007 | Acosta et al. |
| 2007/0221733 A1 | 9/2007 | Roquemore |
| 2008/0164309 A1 | 7/2008 | Latimer et al. |
| 2008/0283611 A1 | 11/2008 | Knowles et al. |
| 2009/0188980 A1 | 7/2009 | Bobba et al. |
| 2010/0139989 A1 | 6/2010 | Atwater et al. |
| 2010/0148967 A1 | 6/2010 | Friend et al. |
| 2010/0163626 A1 | 7/2010 | Olmstead |
| 2010/0163627 A1 | 7/2010 | Olmstead |
| 2010/0163628 A1 | 7/2010 | Olmstead |
| 2010/0252633 A1 | 10/2010 | Barkan et al. |
| 2011/0008924 A1 | 1/2011 | Yang et al. |
| 2011/0089240 A1 | 4/2011 | Vinogradov et al. |
| 2011/0127333 A1 | 6/2011 | Veksland et al. |
| 2012/0008987 A1 | 1/2012 | Ochiai |
| 2012/0019346 A1 | 1/2012 | Levi |
| 2012/0193416 A1 | 8/2012 | Smith et al. |
| 2012/0211565 A1 | 8/2012 | Colavito et al. |

* cited by examiner

HYBRID-TYPE BIOPTICAL LASER SCANNING AND IMAGING SYSTEM SUPPORTING DIGITAL-IMAGING BASED BAR CODE SYMBOL READING AT THE SURFACE OF A LASER SCANNING WINDOW

BACKGROUND OF DISCLOSURE

1. Field of Disclosure

The present disclosure relates generally to improvements in reading bar code symbols in point-of-sale (POS) environments in ways which increase flexibility and POS throughput.

2. Brief Description of the State of Knowledge in the Art

The use of bar code symbols for product and article identification is well known in the art. Presently, various types of bar code symbol scanners have been developed for reading bar code symbols at retail points of sale (POS).

In demanding retail environments, such as supermarkets and high-volume department stores, where high check-out throughput is critical to achieving store profitability and customer satisfaction, it is common to use laser scanning bar code reading systems having both bottom and side-scanning windows to enable highly aggressive scanner performance. In such systems, the cashier need only drag a bar coded product past these scanning windows for the bar code thereon to be automatically read with minimal assistance of the cashier or checkout personal. Such dual scanning window systems are typically referred to as "bi-optical" laser scanning systems as such systems employ two sets of optics disposed behind the bottom and side-scanning windows thereof. Examples of polygon-based bi-optical laser scanning systems are disclosed in U.S. Pat. Nos. 4,229,588; 4,652,732 and 6,814,292; each incorporated herein by reference in its entirety. Commercial examples of bi-optical laser scanners include: the PSC 8500—6-sided laser based scanning by PSC Inc.; PSC 8100/8200, 5-sided laser based scanning by PSC Inc.; the NCR 7876—6-sided laser based scanning by NCR; the NCR7872, 5-sided laser based scanning by NCR; and the MS232x Stratos®H, and MS2122 Stratos®E Stratos 6 sided laser based scanning systems by Metrologic Instruments, Inc., and the MS2200 Stratos®S 5-sided laser based scanning system by Metrologic Instruments, Inc.

With the increasing appearance of 2D bar code symbologies in retail store environments (e.g. reading driver's licenses for credit approval, age proofing etc), there is a growing need to support digital-imaging based bar code reading—at point of sale (POS) stations.

U.S. Pat. No. 7,540,424 B2 and U.S. Publication No. 2008/0283611 A1, assigned to Metrologic Instruments, Inc, describes high-performance digital imaging-based POS bar code symbol readers employing planar illumination and digital linear imaging techniques, as well as area illumination and imaging techniques.

U.S. Pat. Nos. 7,137,555; 7,191,947; 7,246,747; 7,527,203 and 6,974,083 disclose hybrid laser scanning and digital imaging systems, in which a digital imager is integrated within a POS-based laser scanning bar code symbol reading system. In such system designs, the digital imager helps the operator read poor quality codes, and also enables the hybrid system to read 2-D symbologies. The use of digital imaging at the POS is able to capture virtually every dimension and perspective of a bar code symbol, and is able to make more educated decisions on how to process the symbology.

However, when using digital imaging, throughput speed at the POS is typically much less than when using a bi-optical laser scanning system, due to expected frame rates and image processing time. Also, with digital imaging, issues often arise with motion tolerance, producing digital images that are blurred and sometimes hard to read.

However, despite the many improvements in both laser scanning and digital imaging based bar code symbol readers over the years, there is still a great need in the art for improved hybrid-type bar code symbol reading system which is capable of high-performance and robust operations in demanding POS scanning environments, while avoiding the shortcomings and drawbacks of prior art systems and methodologies.

OBJECTS AND SUMMARY

Accordingly, a primary object of the present disclosure is to provide an improved hybrid-type bi-optical bar code symbol reading system for use in POS environments, which is free of the shortcomings and drawbacks of prior art systems and methodologies.

Another object is to provide a hybrid-type bi-optical bar code symbol reading system having a vertical housing section having a vertical scanning window and a horizontal housing section having a horizontal scanning window, from which laser scanning planes are projected and intersect within a 3D scanning volume defined between the vertical and horizontal scanning windows, and wherein a digital imaging module is supported within the vertical section of the system housing and automatically projects a field of view (FOV) within the 3D scanning volume when an object is detected in close proximity to the vertical scanning window of the system, providing an automatically-triggered digital imaging region in close proximity to the vertical scanning window.

Another object is to provide a hybrid-type bi-optical bar code symbol reading system, wherein, when the digital imaging module is received in its docking port, its field of view (FOV) is effectively focused slightly before the vertical scanning window of the system, so that when an object bearing a bar code is brought close to the vertical scanning window by the operator, the bar code symbol or supporting object is automatically detected, and the digital imaging module is triggered to aggressively capture and process one or more digital images of bar codes in an effort to quickly decode the bar code and generate symbol character data representative of the same.

Another object is to provide a hybrid-type bi-optical bar code symbol reading system, wherein, when the digital imaging module is removed from its docking port, and held in the hand of an operator, its field of view (FOV) is focused along the working range of the system for reading bar codes anywhere along its field of view during its mobile imaging mode of operation.

Another object is to provide a hybrid-type bi-optical bar code symbol reading system, wherein a docking portal is provided in either the vertical housing section of the system, for removably interfacing the digital imaging module within the system and supporting digital imaging based functions between the vertical and horizontal scanning windows of the system.

Another object is to provide such a hybrid-type bi-optical bar code symbol reading system, wherein the digital imaging module can be removed by and held in the hand of the operator during checkout operations, and used to read 1D and 2D bar code symbols on products being purchased at the POS station.

Another object is to provide a hybrid-type bi-optical bar code symbol reading system, wherein when docked within its docking portal, the digital imaging module cooperates with a set of field of view (FOV) folding mirrors supported within the system housing, for projecting a field of view out into the 3D scanning volume supported by the system.

Another object is to provide such a hybrid-type bi-optical bar code symbol reading system, wherein one or more laser pattern folding mirrors supported within vertical housing section are used to fold the FOV of the digital imaging module and project the same into the 3D scanning volume.

Another object is to provide such a hybrid-type bi-optical bar code symbol reading system, wherein the docking portal includes a data/power/control interface for interfacing data communication, power charging, and control operations while the digital imaging module is docked within the docking portal.

Another object is to provide a hybrid-type bi-optical bar code symbol reading system that helps provide improvements in worker productivity and checkout speed and throughput.

These and other objects will become apparent hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying figure Drawings in which.

DETAILED DESCRIPTION OF THE ILLUSTRATIVE EMBODIMENT

Figure 1A:
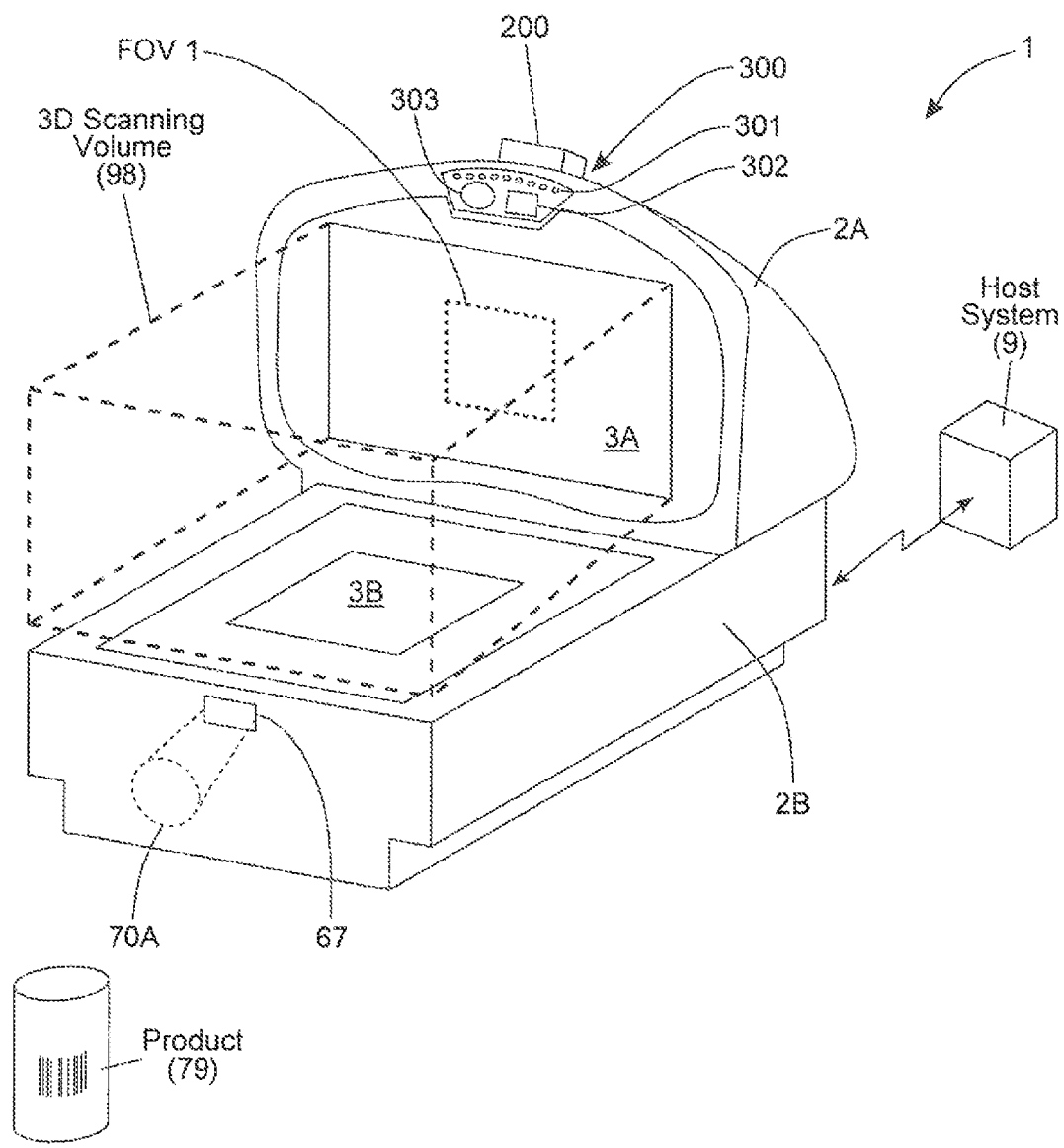
FIG. 1A is a first perspective view of an illustrative embodiment of the hybrid-type bi-optical bar code symbol reading system for installation and use at a point of sale (POS) checkout station in a retail environment, and capable of supporting several different modes of operation including a hybrid laser scanning and digital imaging mode of operation, a laser scanning only mode of operation, and a mobile imaging mode of operation.

Referring to the figures in the accompanying Drawings, the various illustrative embodiments of the apparatus and methodologies will be described in great detail, wherein like elements will be indicated using like reference numerals.

Figure 1B:
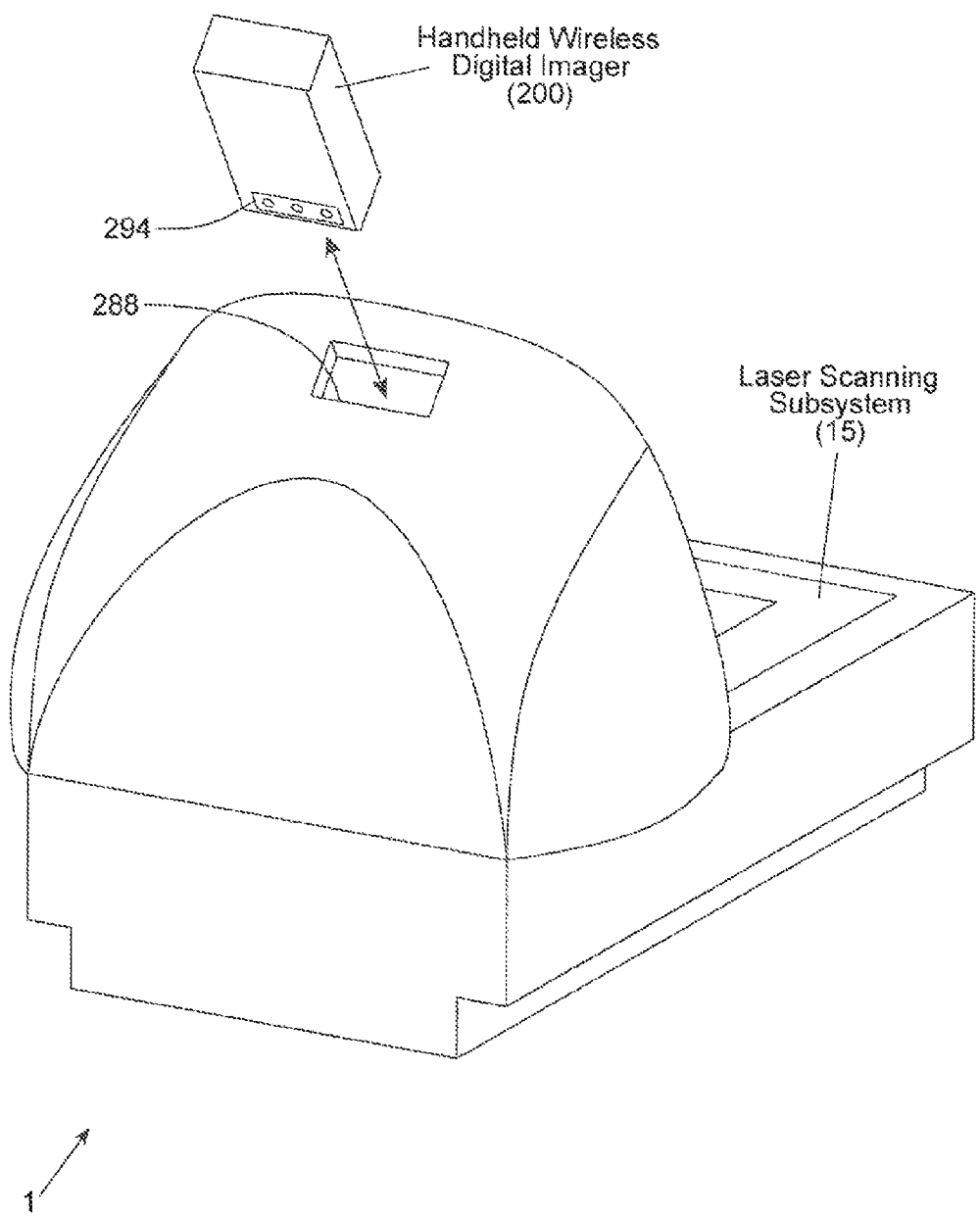
FIG. 1B a second perspective view of the hybrid-type bi-optical bar code symbol reading system of FIG. 1A, showing the insertion or removal of the digital imaging module from its docking port integrated within the vertical section of the system housing.
Figure 1C:
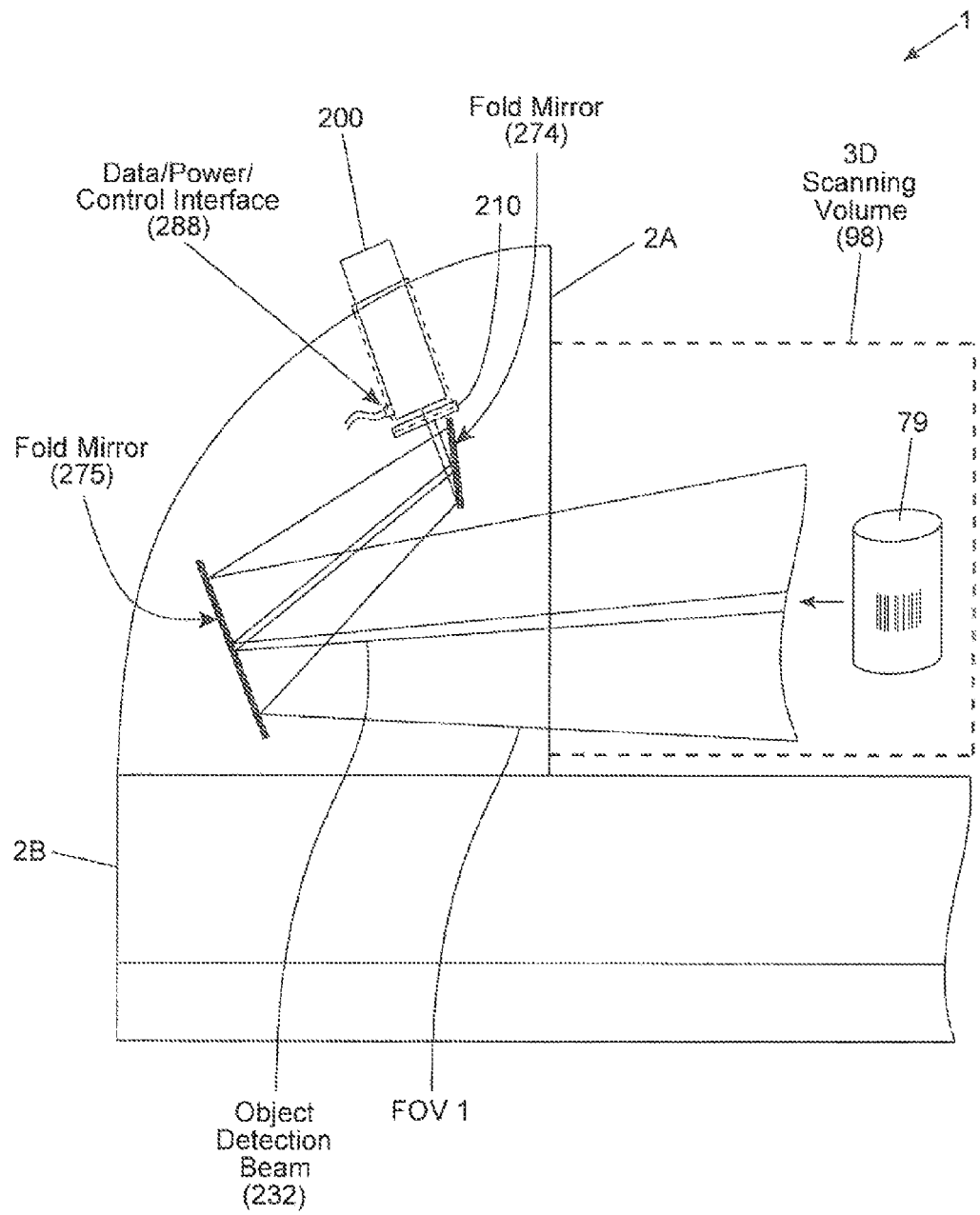
FIG. 1C is a cross-sectional side view of the hybrid-type bi-optical bar code symbol reading system of FIG. 1A, showing the FOV of digital imaging module being transformed by the focusing optical element, and then folded by folding mirrors mounted within the vertical section of the system housing, and a product being automatically detected by the object detection field projected from the digital imaging volume through the vertical scanning window as an operator naturally presents a difficult to read code symbol closely towards the vertical scanning window.
Figure 1D:
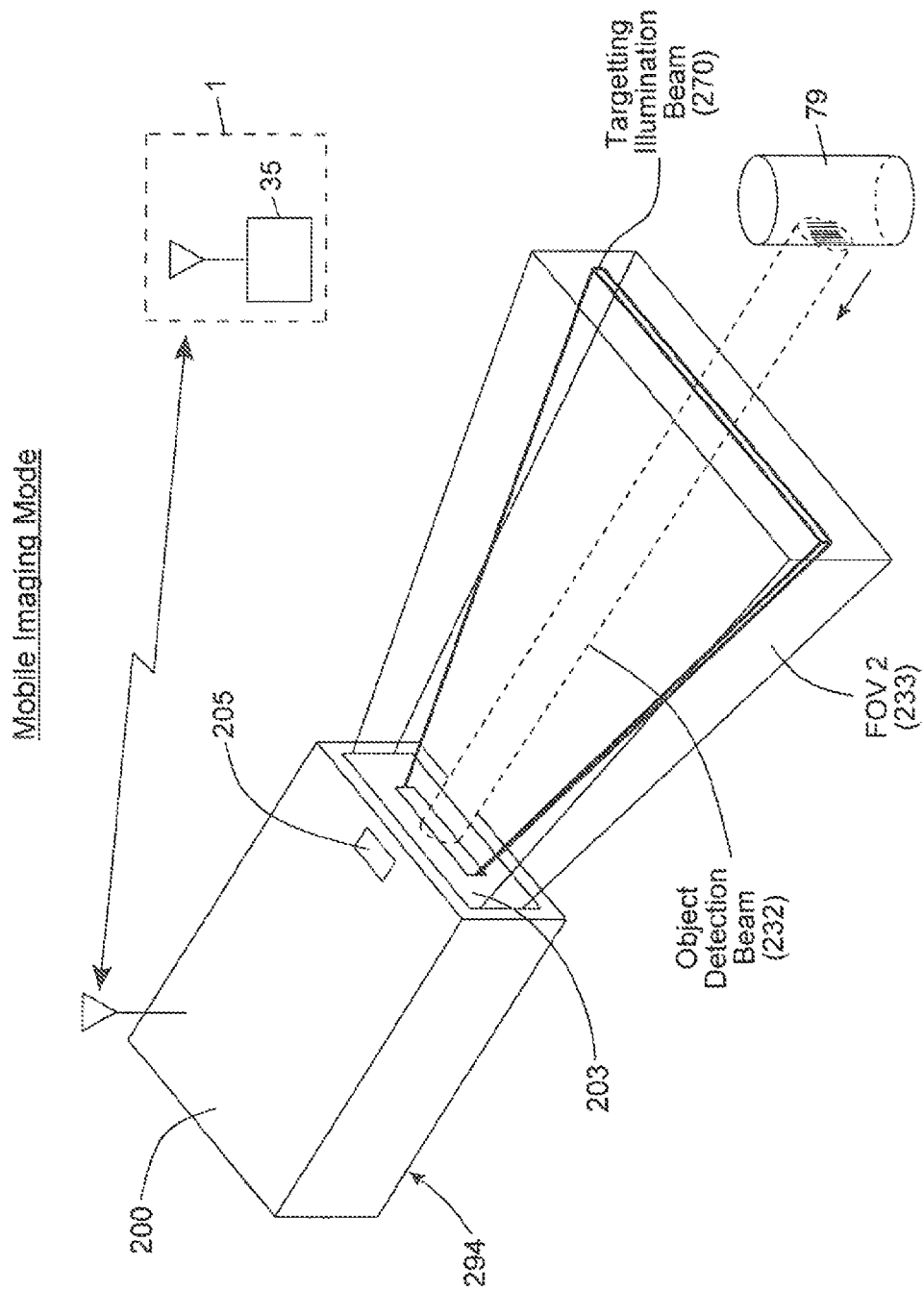
FIG. 1D is a perspective view of the digital imaging module from its docking portal shown in FIG. 1B, and shown being operated in its mobile (hand-supportable) imaging mode of operation, wherein its light targeting beam is automatically generated when an object (e.g. bar coded product) is automatically detected within the field of view (FOV) of the digital imaging module.

FIGS. 1A through 1D show an illustrative embodiment of the hybrid laser-scanning/digital-imaging (i.e. scanning/imaging) based bar code symbol reading system 1 of the present disclosure supporting three different modes of operation, namely: a laser scanning (only) mode of operation shown in FIG. 1B; a mobile/portable digital imaging mode of operation shown in FIG. 1D; and a hybrid scanning/imaging mode of operation shown in FIGS. 1A and 1C. The hybrid scanning/imaging system 1 of the present disclosure, and its various modes of operation, will now be described below in great technical detail.

As shown in FIGS. 1A, 1B and 1C, the hybrid scanning/imaging code symbol reading system of the illustrative embodiment includes a system housing 2 having a vertical housing section 2A having a vertical optically transparent (glass) scanning window 3A, and a horizontal housing section 2B having a horizontal optically transparent (glass) scanning window 3B. As shown, the horizontal and vertical sections 2A and 2B are arranged in an orthogonal relationship with respect to each other such that the horizontal and vertical scanning windows are substantially perpendicular. First and second laser scanning stations 15A and 15B are mounted within the system housing, and provide a laser scanning subsystem 15 for generating and projecting a complex groups of laser scanning planes through laser scanning windows 3A and 3B where the laser scanning planes intersect and produce an omni-directional laser scanning pattern within a 3D scanning volume 98 defined between the vertical and horizontal scanning windows 3A and 3B, as shown in FIGS. 1 and 1C. Details on the laser scanning stations or platforms 15A and 15B can be found in U.S. Pat. No. 7,422,156 incorporated herein by reference, as if set forth fully herein.

As shown in FIG. 1C, an IR-based proximity detector 67 is mounted in the front portion of the housing for automatically detecting the presence of a human operator in front of the 3D scanning volume during system operation. The function of the IR-based proximity detector 67 is to wake up the system (i.e. WAKE UP MODE), and set a SLEEP Timer (T1) which counts how long the system has to read a bar code symbol (e.g. 15 minutes) before the system is automatically induced into its SLEEP MODE, where the polygon scanning element and laser diodes are deactivated to conserve electrical within the system. Preferably, the IR-based proximity (i.e. wake-up) detector 67 is realized using (i) an IR photo-transmitter for generating a high-frequency amplitude modulated IR beam, and (ii) a IR photo-receiver for receiving reflections of the amplitude modulated IR beam, using a synchronous detection circuitry, well known in the art. In FIG. 1A, the transmitted and received amplitude modulated IR beams are indicated by reference numeral 70A.

Figure 2:
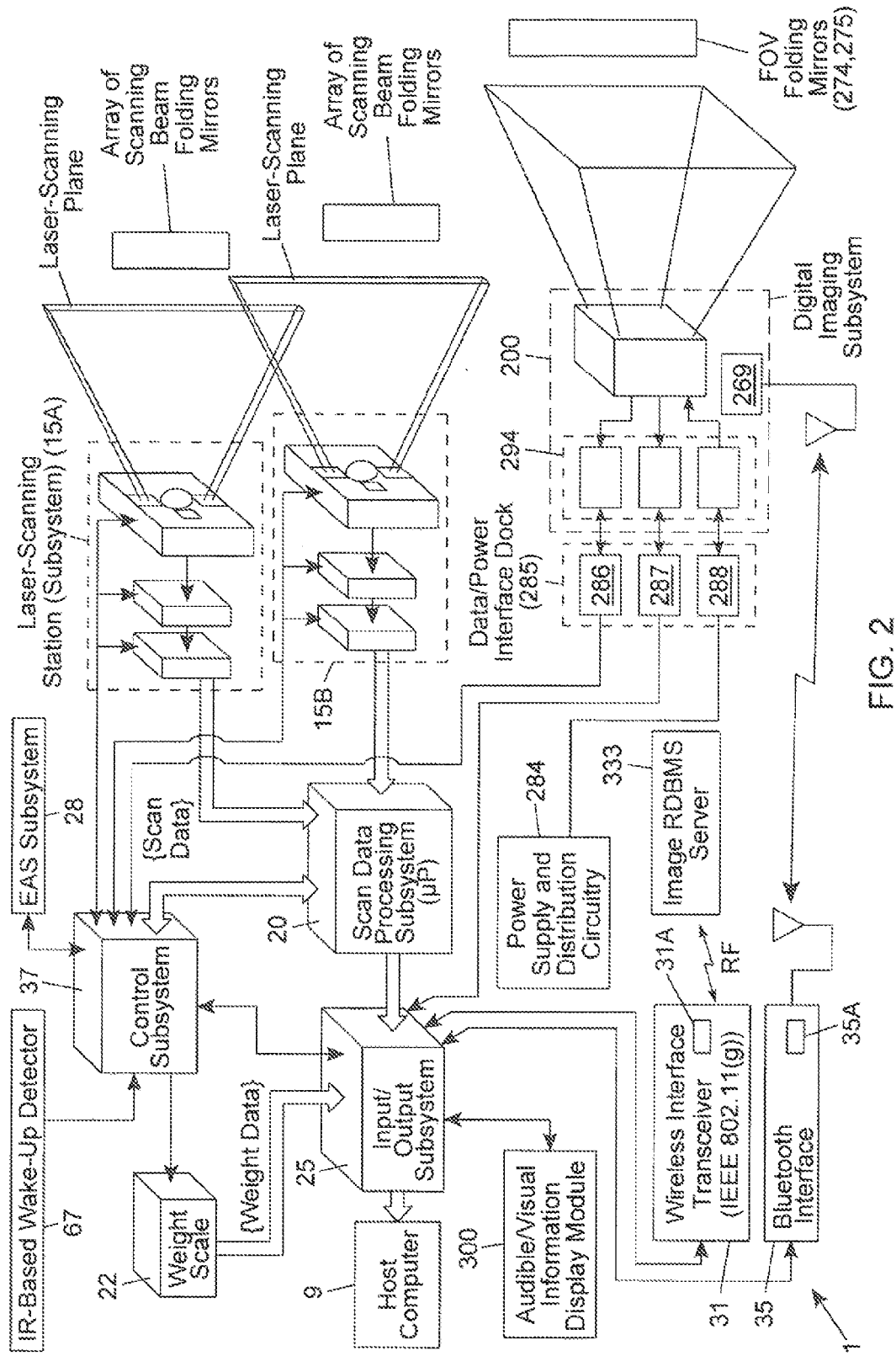
FIG. 2 is a block schematic representation of the hybrid scanning/imaging code symbol reading system of FIGS. 1A through 1D, wherein (i) a pair of laser scanning stations support automatic laser scanning of bar code symbols along a complex of scanning planes passing through the 3D scanning volume of the system, and (ii) a digital imaging module, supported within the system housing, supports imaging-based reading of bar code symbols presented to the vertical scanning window of the system.

As shown in FIG. 1B, a docking portal 288 is formed in the upper housing section of the system housing, and has a geometry closely matching the geometry of the hand-supportable digital imaging module 200 that slides into the docking portal 288. As shown, the digital imaging module 200 has a data/power/control interface 294 on the lower portion of its hand-supportable housing. As shown in FIG. 2, the data/power/control interface 294 is adapted to engage and establish electrical connection with a matching data/power/control interface 285 mounted within the interior portion of the docking portal 288.

As shown in FIG. 1C, the docking portal 288 is mounted within the vertical section of the housing, and includes an optical element 210 which modifies the optical characteristics of the field of view (FOV1) of the portable digital imaging module 200, which is then folded several times by way of FOV folding mirrors 274 through 275, to provide a modified field of view (FOV2) that extends through the vertical scanning window 3A, into the 3D scanning volume, as shown. While not a requirement, one or more of these FOV folding mirrors may be supplied by laser scanning pattern folding mirrors provided in the vertical housing section of the system housing. Preferably, the resulting field of view (FOV2) will extend several inches into the 3D scanning volume (e.g. 6 inches or less), with a depth of focus of a few inches (e.g. 2-3 inches) before the vertical scanning window 3A. In the illustrative embodiment, the FOV2 of the digital imaging module will completely fill the active area of the vertical scanning window 3A when the digital imaging module is installed in the docketing portal. While the digital imaging module will have a small depth of focus about and in front of the vertical scanning window, a primary design objective is to obtain the absolute highest image resolution at the window surface. The benefits of this optical system design are realized when the minimum element resolution of bar code symbols is equal to, or less than, 2.0 mils.

As shown in FIG. 1C, when the digital imaging module 200 is docked in its docking portal 288, the visible targeting beam 270 supported by the digital imaging module in its mobile imaging mode can be suppressed (i.e. disabled by way of the data/power/control interface circuitry provided within the docking portal. At the same time, the automatic object detection subsystem 220 within the digital imaging module 200 will be enabled so that the digital imaging module automatically generates and projects its IR-based detection beam 232 off the FOV folding mirrors and out the vertical scanning window 3A, ready to automatically detect an object being presented to the vertical scanning window, and thus activate the digital imaging module 200 to capture and process digital images of the presented product, and any bar code symbols supported on the surface of the presented product.

As shown in FIG. 1C, during the hybrid scanning/imaging mode of operation, the FOV of the digital imaging module spatially overlaps a portion of the 3D scanning volume of the system. However, in alternative embodiments, the digital imaging FOV need not spatially overlap the 3D scanning volume, but simply fill in a region of space between the vertical scanning window and the edge portion of the 3D scanning volume. This way, when the operator presents a bar coded product through the 3D scanning volume, towards the vertical scanning window, "sure-shot" bar code reading operation will be ensured even when reading the most-difficult-to-read bar code symbols.

As shown in FIG. 1D, the hand-supportable digital imaging module 200 is removed from its docking portal 288 in the system housing and shown being used in the mobile imaging mode of operation. Typically, this mode of operation, where the digital imaging module 200 is held in the hand of the operator, is used to read bar code symbols on difficult to read bar code labels on products, or when it is otherwise convenient to read bar code symbols using a hand-held digital at a POS station. As shown, during this mode, the hand-held digital imaging module 200 is operated in its automatic triggering mode, where upon automatically detecting an object using its IR object detection subsystem 220, its object targeting subsystem 231 automatically generates a visible targeting beam 270 that is aligned with the bar code symbol to be read. Then when the operator depresses the manual trigger switch 205, one or more digital images of the detected object are captured and processed in effort to read the targeted code symbol on the object. If and when the bar code symbol is read (i.e. decoded), then symbol character data is automatically generated and transmitted to the host computer 9, via the wireless Bluetooth communication interface supported in the mobile digital imaging module and the hybrid scanning/imaging system.

Figure 3:
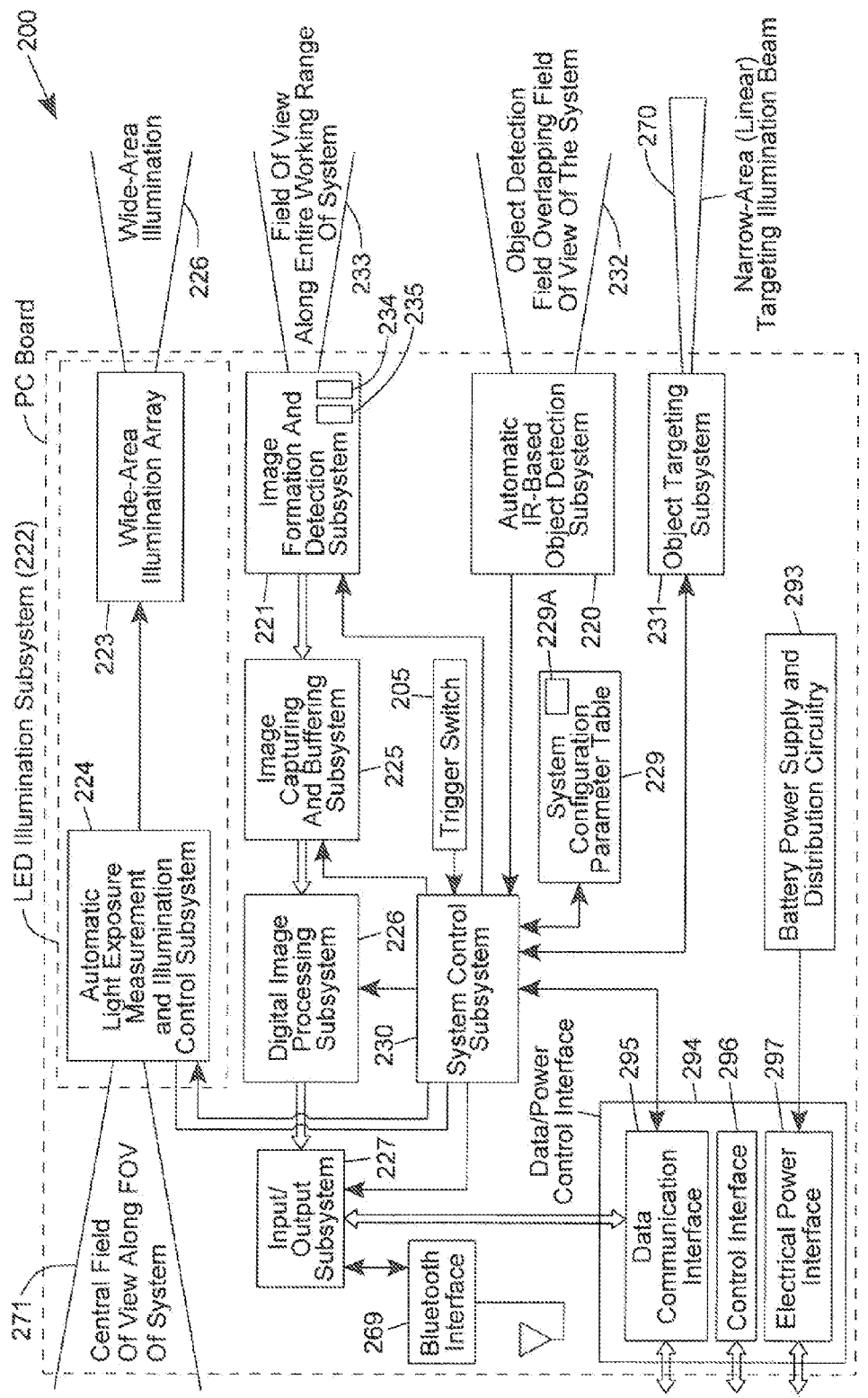
FIG. 3 is a block schematic representation of the digital imaging module supported within the hybrid scanning/imaging code symbol reading system of FIGS. 1A through 1C.

As shown in the system diagram of FIG. 2, hybrid scanning/imaging system 1 generally comprises: laser scanning stations 15A and 15B for generating and projecting groups of laser scanning planes through the vertical and horizontal scanning windows 3A and 3B, respectively, and generating scan data streams from scanning objects in the 3D scanning volume; a scan data processing subsystem 20 for supporting automatic scan data processing based bar code symbol reading using scan data streams generated from stations 15A and 15B; an input/output subsystem 25 for interfacing with the image processing subsystem 20, the electronic weight scale 22, RFID reader 26, credit-card reader 27, Electronic Article Surveillance (EAS) Subsystem 28 (including a Sensormatic® EAS tag deactivation block 29 integrated in system, and an audible/visual information display subsystem (i.e. module) 300; a BlueTooth® RF 2-way communication interface 135 including RF transceivers and antennas 103A for connecting to Blue-tooth® enabled hand-held scanners, imagers, PDAs, portable computers 136 and the like, for control, management, application and diagnostic purposes; mobile digital imaging module 200 specified in FIG. 3, and having data/power/control interface 294 provided on the exterior of the hand-supportable module housing, and interfacing and establishing electrical interconnections with data/power/control interface 285 when the digital imaging module 200 is docked in its docking portal 288 as shown in FIG. 1C; a control subsystem 37 for controlling (i.e. orchestrating and managing) the operation of the laser scanning stations (i.e. subsystems), the functions of the digital imaging module 200 when docked in the docking portal 288, other subsystems supported in the system; IR-based wake-up detector 67, operably connected to the control subsystem 37, for generating and supplying a first trigger signal to the system controller in response to automatic detection of an operator in proximity (e.g. 1-2 feet) of the system housing.

In the illustrative embodiment, each laser scanning station 15A, 15B is constructed from a rotating polygon, a laser diode source, light collection optics, a photodiode, and other optics components arranged as disclosed in U.S. Pat. No. 7,422,156, incorporated herein by reference.

In FIG. 2, the bar code symbol reading module employed along each channel of the scan data processing subsystem 20 can be realized using conventional bar code reading techniques, including bar code symbol stitching-based decoding techniques, well known in the art.

As shown in FIG. 3, the digital imaging module or subsystem 200 employed in the illustrative embodiment of the hybrid scanning/imaging system 1 is realized as a complete stand-alone hand-supportable digital imager, comprising a number of components, namely: an image formation and detection (i.e. camera) subsystem 221 having image formation (camera) optics 234 for producing a field of view (FOV) upon an object to be imaged and a CMOS or like area-type image detection array 235 for detecting imaged light reflected off the object during illumination operations in an image capture mode in which at least a plurality of rows of pixels on the image detection array are enabled; a LED-based illumination subsystem 222 employing an LED illumination array 232 for producing a field of narrow-band wide-area illumination 226 within the entire FOV 233 of the image formation and detection subsystem 221, which is reflected from the illuminated object and transmitted through a narrow-band transmission-type optical filter 540 realized within the hand-supportable and detected by the image detection array 35, while all other components of ambient light are substantially rejected; an object targeting illumination subsystem 531 for generating a narrow-area targeting illumination beam 570 into the FOV to help allow the user align bar code symbols within the active portion of the FOV where imaging occurs; an IR-based object detection subsystem 520 for producing an IR-based object detection field 232 within FOV1 (or FOV2), and automatically generating and supplying a second trigger signal to the system controller control subsystem 270 during mobile digital imaging mode of operation shown in FIG. 1D, and also to the system controller 37 within the system housing when the hybrid bi-optical system 1 is operating in its hybrid scanning/imaging mode of operation shown in FIGS. 1A and 1C; an automatic light exposure measurement and illumination control subsystem 224 for controlling the operation of the LED-based illumination subsystem 222; an image capturing and buffering subsystem 225 for capturing and buffering 2-D images detected by the image formation and detection subsystem 221: a digital image processing subsystem 226 for processing 2D digital images captured and buffered by the image capturing and buffering subsystem 225 and reading 1D and/or 2D bar code symbols represented therein; an input/output subsystem 527 for outputting processed image data and the like to an external host system or other information receiving or responding device; a system memory 229 for storing data implementing a configuration table 229A of system configuration parameters (SCPs); data/power/control interface 294 including a data communication interface 295, a control interface 296, and an electrical power interface 297 operably connected to an on-board battery power supply and power distribution circuitry 293; a Bluetooth communication interface, interfaced with I/O subsystem 227; and a system control subsystem 230 integrated with the subsystems above, for controlling and/or coordinating these subsystems during system operation.

The primary function of the object targeting subsystem 231 is to automatically generate and project a visible linear-targeting illumination beam across the central extent of the FOV of the system in response to either (i) the automatic detection of an object during hand-held imaging modes of system operation, or (ii) manual detection of an object by an operator when s/he manually actuates the manually-actuatable trigger switch 205. In order to implement the object targeting subsystem 231, a pair of visible LEDs can be arranged on opposite sites of the FOV optics 234 so as to generate a linear visible targeting beam 270 that is projected off a FOV folding and out the imaging window 203, as shown and described in detail in U.S. Publication No. US20080314985 A1, incorporated herein by reference in its entirety.

The primary function of the object detection subsystem 220 is to automatically produce an object detection field 232 within the FOV 233 of the image formation and detection subsystem 221, to detect the presence of an object within predetermined regions of the object detection field 232, and to generate control signals which are supplied to the system control subsystem 230 for indicating when an object is detected within the object detection field of the system. The object motion detection subsystem 220 is implemented using IR LED and IR photodiodes to automatically detect the presence of objects in the FOV of the system.

The image formation and detection subsystem 221 includes image formation (camera) optics 234 for providing a field of view (FOV) 233 upon an object to be imaged and a CMOS area-type image detection array 235 for detecting imaged light reflected off the object during illumination and image acquisition/capture operations.

The primary function of the LED-based illumination subsystem 222 is to produce a wide-area illumination field 36 from the LED array 223 when an object is automatically detected within the FOV. Notably, the field of illumination has a narrow optical-bandwidth and is spatially confined within the FOV of the image formation and detection subsystem 521 during modes of illumination and imaging, respectively. This arrangement is designed to ensure that only narrow-band illumination transmitted from the illumination subsystem 222, and reflected from the illuminated object, is ultimately transmitted through a narrow-band transmission-type optical filter subsystem 240 within the system and reaches the CMOS area-type image detection array 235 for detection and processing, whereas all other components of ambient light collected by the light collection optics are substantially rejected at the image detection array 535, thereby providing improved SNR, thus improving the performance of the system.

The narrow-band transmission-type optical filter subsystem 240 is realized by (1) a high-pass (i.e. red-wavelength reflecting) filter element embodied within at the imaging window 203, and (2) a low-pass filter element mounted either before the CMOS area-type image detection array 235 or anywhere after beyond the high-pass filter element, including being realized as a dichroic mirror film supported on at least one of the FOV folding mirrors employed in the module.

The automatic light exposure measurement and illumination control subsystem 224 performs two primary functions: (1) to measure, in real-time, the power density [joules/cm] of photonic energy (i.e. light) collected by the optics of the system at about its image detection array 235, and to generate auto-exposure control signals indicating the amount of exposure required for good image formation and detection; and (2) in combination with the illumination array selection control signal provided by the system control subsystem 230, to automatically drive and control the output power of the LED array 223 in the illumination subsystem 222, so that objects within the FOV of the system are optimally exposed to LED-based illumination and optimal images are formed and detected at the image detection array 235.

The primary function of the image capturing and buffering subsystem 225 is (1) to detect the entire 2-D image focused onto the 2D image detection array 235 by the image formation optics 234 of the system, (2) to generate a frame of digital pixel data for either a selected region of interest of the captured image frame, or for the entire detected image, and then (3) buffer each frame of image data as it is captured.

Notably, in the illustrative embodiment, the system has both single-shot and video modes of imaging. In the single shot mode, a single 2D image frame (31) is captured during each image capture and processing cycle, or during a particular stage of a processing cycle. In the video mode of imaging, the system continuously captures frames of digital images of objects in the FOV. These modes are specified in further detail in U.S. Patent Publication No. 2008/0314985 A1, incorporated herein by reference in its entirety.

The primary function of the digital image processing subsystem 226 is to process digital images that have been captured and buffered by the image capturing and buffering subsystem 225, during modes of illumination and operation. Such image processing operations include image-based bar code decoding methods as described in U.S. Pat. No. 7,128, 266, incorporated herein by reference.

The primary function of the input/output subsystem 227 is to support universal, standard and/or proprietary data communication interfaces with host system 9 and other external devices, and output processed image data and the like to host system 9 and/or devices, by way of such communication interfaces. Examples of such interfaces, and technology for implementing the same, are given in U.S. Pat. No. 6,619,549, incorporated herein by reference.

The primary function of the system control subsystem 230 is to provide some predetermined degree of control, coordination and/or management signaling services to each subsystem component integrated within the system, when operated in its mobile digital imaging mode of operation shown in FIG. 1D. Also, when the digital imaging module 200 is docked in docking portal 288, and interfaced with data/power/control interface 285, shown in FIG. 2, system control subsystem 230 will function as a slave controller under the control of master control subsystem 37. While this subsystem can be implemented by a programmed microprocessor, in the preferred embodiments of the present disclosure, this subsystem is implemented by the three-tier software architecture supported on micro-computing platform, described in U.S. Pat. No. 7,128,266, incorporated herein by reference.

The primary function of the manually-actuatable trigger switch 205 integrated with the housing is to enable the user, during the mobile digital imaging mode shown in FIG. 1D, to generate a control activation signal (i.e. trigger event signal) upon manually depressing the same (i.e. causing a trigger event), and to provide this control activation signal to the system control subsystem 230 for use in carrying out its complex system and subsystem control operations, described in detail herein.

The primary function of the system configuration parameter (SCP) table 229A in system memory is to store (in non-volatile/persistent memory) a set of system configuration and control parameters (i.e. SCPs) for each of the available features and functionalities, and programmable modes of supported system operation, and which can be automatically read and used by the system control subsystem 230 as required during its complex operations. Notably, such SCPs can be dynamically managed as taught in great detail in co-pending U.S. Publication No. 2008/0314985 A1, incorporated herein by reference.

Figure 4:
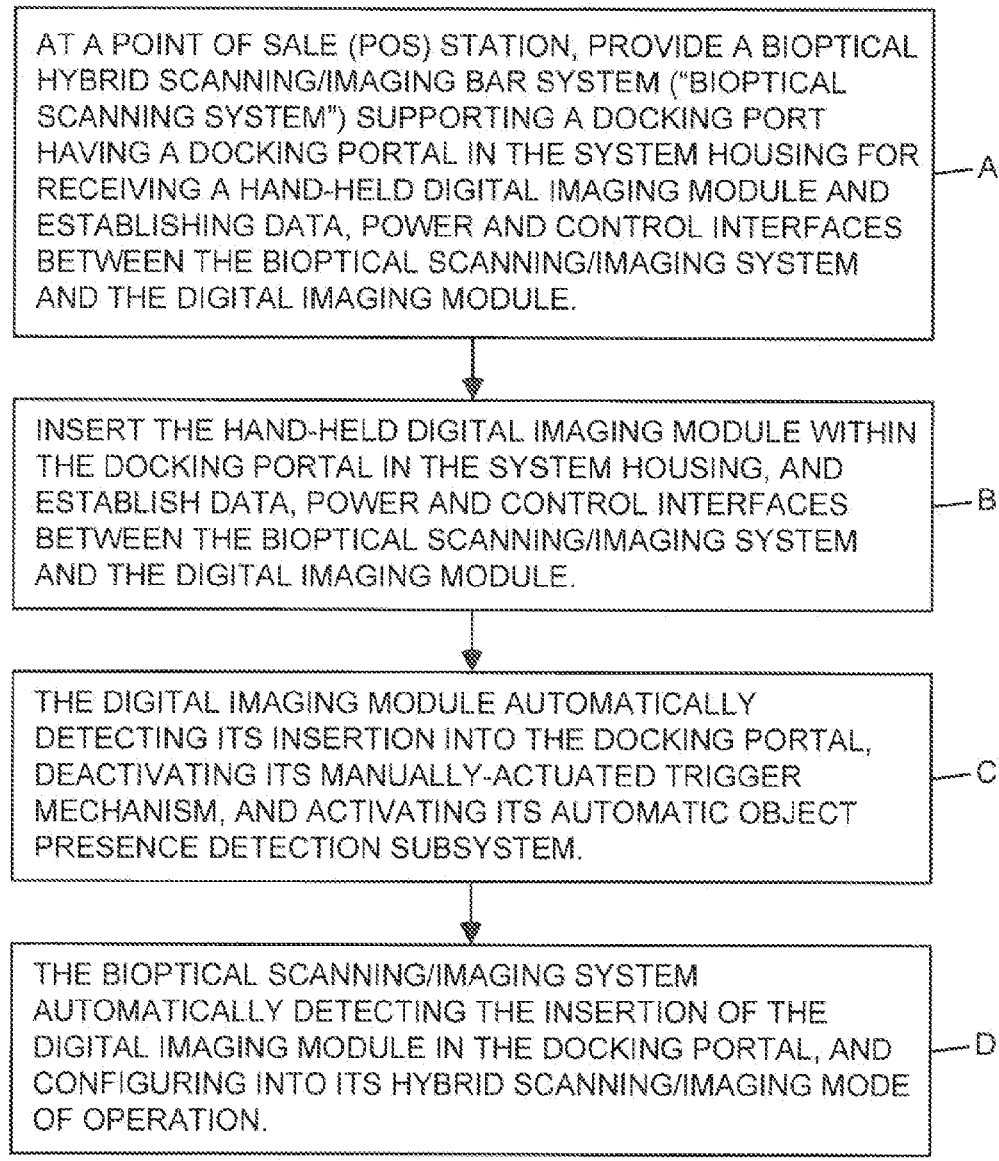
FIG. 4 is a flow chart setting forth the major steps of the method of configuring the hybrid scanning/imaging code symbol reading system of FIGS. 1A through 3, into its hybrid scanning/imaging mode of operation, shown supported in FIGS. 1A and 1C.

FIG. 4 describes the major steps performed when configuring the hybrid scanning/imaging code symbol reading system of FIGS. 1A through 3, into its hybrid scanning/imaging mode of operation, shown supported in FIGS. 1A and 1C.

As indicated at Block A, at a point of sale (POS) station, a bi-optical laser scanning and digital imaging bar code symbol reading system is provided. The bi-optical system supports a docking portal ("receptacle") for receiving a hand-held digital imaging module and establishing data, power and control interfaces between the bi-optical system and its digital imaging module. Collectively, the bi-optical laser scanning system and digital imaging module provide a bi-optical hybrid scanning/imaging system at the POS.

As indicated at Block B, the hand-held digital imager is inserted within the docketing portal, to establish data, power and control interfaces between the bi-optical hybrid system and the hand-held digital imaging module.

As indicated at Block C, the hand-held digital imaging module automatically detects its insertion into the docking portal, deactivating its manually-actuated trigger mechanism and visible targeting beam subsystem, and activating its automatic object presence detection subsystem.

As indicated at Block D, the bi-optical hybrid system automatically detects the insertion of the digital imaging module in the docking portal, and configures into its hybrid scanning/imaging mode of operation.

Figure 5A:
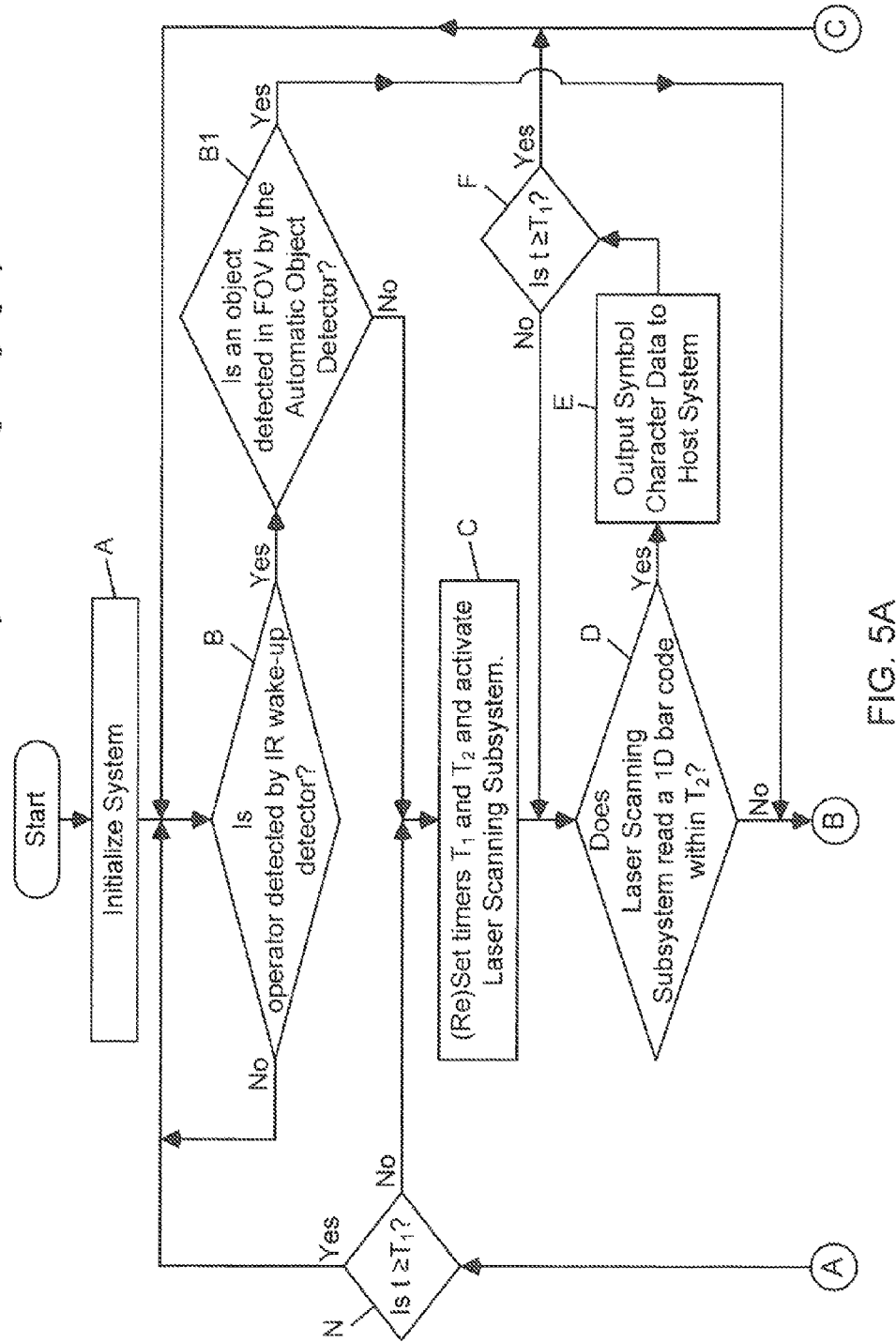
FIGS. 5A and 5B, taken together, set forth a flow chart describing the control process supported by the system controller within the hybrid scanning/imaging code symbol reading system of the illustrative embodiment, during its hybrid scanning/imaging mode of operation.
Figure 5B:
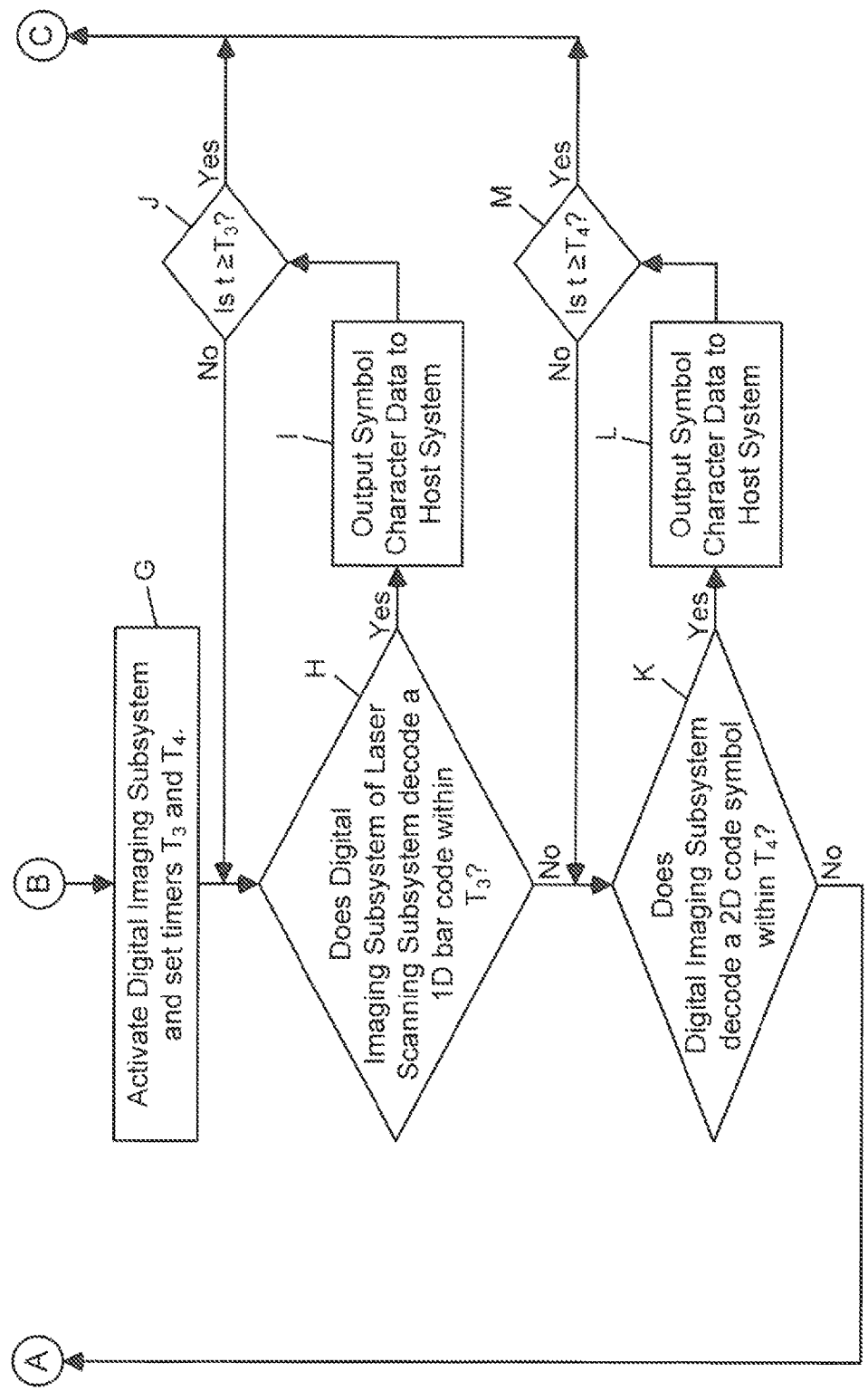

FIGS. 5A and 5B describe the control process supported by the system controller within the bi-optical hybrid scanning/imaging code symbol reading system of the illustrative embodiment, during its hybrid scanning/imaging mode of operation.

As indicated at Block A in FIG. 5A, the system is initialized (i.e. parameters are reset, and the system is SLEEP mode).

As Block B, the system controller determines whether or not an operator is detected by the IR wake-up detector installed in the vertical or horizontal housing system. If a wake up event is not detected at Block B the system remains at Block B until a wake up event occurs. When a wake-up event occurs, the system controller proceeds to Block B1, at which the system controller determines whether or not an object (e.g. product) is automatically detected within the FOV (e.g. in close proximity to the vertical scanning window). If an object is detected in the FOV, then the system controller proceeds to Block G in FIG. 5B. If an object is not detected in the FOV, then the system controller proceeds to Block C.

As indicated at Block C, the system resets timers T1 (wake up timer) and T2 (laser scanning mode timer) and activates laser scanning into operation, causing its polygon scanning elements to rotate, laser scanning planes to be generated and scanned across the 3D scanning volume, collecting and processing scan data off objects located therein, including bar code symbols on the objects to be read.

At Block D, the system controller determines whether or not the laser scanning subsystem (15A and 15B) reads a 1D bar code symbol within time T2. If a 1D bar code symbol is read at Block D, then at Block E the system controller outputs symbol character data to the host system. If the wake up timer (T1) has not timed out at Block F, then the system controller returns to Block D. If the wake up timer (T1) has timed out at Block F, then the system controller returns to Block B, as shown in FIG. 5A.

If at Block D, the system controller determines that the laser scanning subsystem (15A and 15B) does not read a 1D bar code symbol within time T2, then at Block G in FIG. 5B, the system controller activates the digital imaging subsystem (i.e. module) 200, and sets times T3 and T4, as shown.

At Block H, the system controller determines whether or not the laser scanning subsystem (15A, 15B) and/or digital imaging subsystem 200 reads a 1D bar code symbol within time T2. If so, then at Block I, the system controller outputs symbol character data to the host system, and then at Block J determines if Timer T3 has lapsed. If not, then the system controller returns to Block H, as shown, to possibly read another 1D bar code symbol.

If at Block H, the system controller determines the laser scanning subsystem (15A, 15B) and/or digital imaging subsystem 200 cannot read a 1D bar code symbol within time T2, then at Block K, the system controller determines whether or not the digital imaging subsystem (i.e. module 200) decodes a 2D bar code symbol with time period T4. If so, then at Block L, the system controller outputs symbol character data to the host system, and then at Block J determines if Timer T4 has lapsed. If the digital imaging subsystem does not read a 2D bar code symbol within time period T4, then the system controller advanced to Block N, and determines if the wake up timer T1 has lapsed. If timer T1 has lapsed, then the system controller returns to Block B, as shown in FIG. 5A. If timer T1 has not lapsed, then the system controller returns to Block C, resetting timers T1 and T2, and activating the laser scanning subsystem only, as shown, and continuing along the control loop shown in FIG. 5A.

Modifications that Come to Mind

The above-described control process has been provided as an illustrative example of how the laser scanning subsystem and digital imaging subsystem can be controlled when the hybrid system is operating in its hybrid scanning/imaging mode of operation. Variations and modifications to this control process will readily occur to those skilled in the art having the benefit of the present disclosure. All such modifications and variations are deemed to be within the scope of the accompanying Claims.

What is claimed is:

1. A hybrid-type bi-optical symbol reading system supporting a hybrid laser scanning and digital imaging mode of operation, said hybrid-type bi-optical symbol reading system comprising:

a system housing comprising a vertical housing section having a vertical scanning window and a horizontal housing section having a horizontal scanning window;

a laser scanning subsystem disposed in said system housing, for generating and projecting a plurality of laser scanning planes through said vertical and horizontal scanning windows, which intersect within a 3D scanning volume defined between said vertical and horizontal scanning windows and provide a laser scanning pattern within said 3D scanning volume, for scanning one or more objects within said 3D scanning volume and producing scan data for decode processing;

a scan data processor for processing said scan data produced by said laser scanning subsystem in effort to read a symbol on each object passed through said 3D scanning volume;

a digital imaging subsystem, disposed within said vertical section of said system housing, for automatically projecting a field of view (FOV) in close proximity to said vertical scanning window, and capturing and processing one or more digital images of an object present in said FOV;

a digital image processor for processing said one or more digital images produced by said digital imaging subsystem in effort to read a symbol on each object passed through said FOV;

an automatic object detector for automatically detecting the presence of an object in said FOV when brought in close proximity to said vertical scanning window, and generating a trigger signal in response to the detection of said object in close proximity to said vertical scanning window; and a system controller for controlling the operation of said laser scanning subsystem and said digital imaging subsystem during said hybrid laser scanning and digital imaging mode of operation;

wherein upon generation of said trigger signal, said system controller activates said digital imaging subsystem to illuminate said object in said FOV and capture and process one or more digital images of said object in effort to read a symbol on said object;

wherein said digital imaging subsystem and said digital image processor are realized as a digital imaging module having a hand-supportable module housing;

wherein said system housing comprises a docking portal for receiving said digital imaging module;

wherein said digital imaging module supports a mobile digital imaging mode of operation when said digital imaging module is removed said docking portal; and wherein when said digital imaging module is removed from said docking portal and held in the hand of an operator, said FOV is focused as to be capable of reading symbols located along a working range of said mobile imaging module.

2. The hybrid-type bi-optical symbol reading system of claim 1, wherein said laser scanning pattern is an omni-directional laser scanning pattern within said 3D scanning volume.

3. The hybrid-type bi-optical symbol reading system of claim 1, wherein said FOV is focused slightly before said vertical scanning window, adjacent said 3D scanning volume.

4. The hybrid-type bi-optical symbol reading system of claim 1, comprising an automatic wake-up detector for detecting the presence of an operator in proximity of said system housing;

wherein when said automatic wake-up detector detects the presence of said operator, said system controller activates said laser scanning subsystem causing laser scanning planes to be generated and scanned across said 3D scanning volume, collecting and processing scan data off objects located therein, including symbols on the objects to be read.

5. The hybrid-type bi-optical symbol reading system of claim 4, wherein if said laser scanning subsystem does not successfully read a symbol within a first predetermined time period, then said system controller also activates said digital imaging subsystem enabling the capturing and processing digital images in effort to read a symbol on an object in said 3D scanning volume while said laser scanning subsystem collects and processes scan data in effort to read a symbol on the object in said 3D scanning volume.

6. The hybrid-type bi-optical symbol reading system of claim 4, wherein if said automatic object detector detects an object in close proximity to said vertical scanning window, then said automatic object detector automatically triggers said digital imaging subsystem to illuminate said object in said FOV and capture and process one or more digital images of said object in effort to read a symbol on said object.

7. The hybrid-type bi-optical symbol reading system of claim 1, wherein said module housing comprises a first data/power/control interface circuit; and wherein said docking portal comprises a second data/power/control interface circuit so that an interface is established between said first and second data/power/control interface circuits.

8. The hybrid-type bi-optical symbol reading system of claim 7, wherein said data/power/control interface circuitry within said docking portal supports data communication, power charging, and control operations while said digital imaging module is docked within said docking portal.

9. The hybrid-type bi-optical symbol reading system of claim 1, wherein said docking portal is provided in the vertical housing.

10. The hybrid-type bi-optical symbol reading system of claim 1, wherein when docked within said docking portal, said digital imaging module cooperates with a set of field of view folding mirrors supported within the vertical section of said system housing, for projecting said FOV out into said 3D scanning volume.

11. The hybrid-type bi-optical symbol reading system of claim 1, wherein said vertical housing section comprises one or more laser pattern folding mirrors, and at least one of said laser scanning pattern folding mirrors is used to fold and project said FOV into said 3D scanning volume.

12. The hybrid-type bi-optical symbol reading system of claim 1, wherein said digital imaging module contains said automatic object detector.

13. The hybrid-type bi-optical symbol reading system of claim 1, wherein said automatic object detector includes an IR light beam transmitter for transmitting an IR light beam into said FOV, and an IR light receiver for receiving IR light transmitted from said IR light transmitter and reflected and/or scattered off an object in said FOV.

14. The hybrid-type bi-optical symbol reading system of claim 1, comprising a first wireless RF transceiver;
wherein said digital imaging module comprises a second wireless RF transceiver mounted within said hand-supportable module housing, for establishing a two-way wireless data communication link between said first wireless RF transceiver and said second wireless RF transceiver during said mobile digital imaging mode of operation.

15. A hybrid-type bi-optical symbol reading system supporting a hybrid laser scanning and digital imaging mode of operation, said hybrid-type bi-optical symbol reading system comprising:
a system housing comprising a vertical housing section having a vertical scanning window and a horizontal housing section having a horizontal scanning window;
a laser scanning subsystem disposed in said system housing, for generating and projecting a plurality of laser scanning planes through said vertical and horizontal scanning windows, which intersect within a 3D scanning volume defined between said vertical and horizontal scanning windows and provide a laser scanning pattern within said 3D scanning volume, for scanning one or more objects within said 3D scanning volume and producing scan data for decode processing;
a scan data processor for processing said scan data produced by said laser scanning subsystem in effort to read a symbol on each object passed through said 3D scanning volume;
a digital imaging subsystem, disposed within said vertical section of said system housing, for automatically projecting a field of view (FOV) in close proximity to said vertical scanning window, and capturing and processing one or more digital images of an object present in said FOV;
a digital image processor for processing said one or more digital images produced by said digital imaging subsystem in effort to read a symbol on each object passed through said FOV;
an automatic wake-up detector for detecting the presence of an operator in proximity to said system housing, and generating a first trigger signal in response to the detection of said operator in proximity to said system housing;
an automatic object detector for automatically detecting the presence of an object within said FOV, and generating a second trigger signal in response to the detection of said object in said FOV; and a system controller, responsive to said first and second trigger signals, for controlling the operation of said laser scanning subsystem and said digital imaging subsystem during said hybrid laser scanning and digital imaging mode of operation;
wherein upon generation of said first trigger signal, said system controller activates said laser scanning subsystem causing laser scanning planes to be generated and scanned across said 3D scanning volume, collecting and processing scan data off objects located therein; and
wherein upon generation of said second trigger signal, said system controller activates said digital imaging subsystem to illuminate said object in said FOV and capture and process one or more digital images of said object in effort to read a symbol on said object;
wherein said digital imaging subsystem and said digital image processor are realized as a digital imaging module having a hand-supportable module housing;
wherein said system housing comprises a docking portal for receiving said digital imaging module;
wherein said digital imaging module supports a mobile digital imaging mode of operation when said digital imaging module is removed said docking portal; and
wherein when said digital imaging module is removed from said docking portal and held in the hand of an operator, said FOV is focused as to be capable of reading symbols located along a working range of said mobile imaging module.

16. The hybrid-type bi-optical symbol reading system of claim 15, wherein said laser scanning pattern is an omni-directional laser scanning pattern within said 3D scanning volume.

17. The hybrid-type bi-optical symbol reading system of claim 15, wherein if said laser scanning subsystem does not successfully read a symbol within a first predetermined time period, then said system controller also activates said digital imaging subsystem enabling the capturing and processing of digital images in effort to read a symbol on an object in said 3D scanning volume while said laser scanning subsystem collects and processes scan data in effort to read a bar code symbol on the object in said 3D scanning volume.

18. The hybrid-type bi-optical symbol reading system of claim 17, wherein if said automatic object detector detects an object in close proximity to said vertical scanning window, then said automatic object detector automatically triggers said digital imaging subsystem to illuminate said object in said FOV and capture and process one or more digital images of said object in effort to read a symbol on said object.

19. A hybrid-type bi-optical symbol reading system supporting a hybrid laser scanning and digital imaging mode of operation and a portable digital imaging mode of operation, said hybrid-type bi-optical symbol reading system comprising:
a system housing comprising a vertical housing section having a vertical scanning window, a horizontal housing section having a horizontal scanning window, and a docking portal;
a laser scanning subsystem disposed in said system housing, for generating and projecting a plurality of laser scanning planes through said vertical and horizontal scanning windows, which intersect within a 3D scanning volume defined between said vertical and horizontal scanning windows and provide a laser scanning pattern within said 3D scanning volume, for scanning one or more objects within said 3D scanning volume and producing scan data for decode processing;

a scan data processor for processing said scan data produced by said laser scanning subsystem in effort to read a symbol on each object passed through said 3D scanning volume, and generate symbol character data representative of symbols read by said scan data processor;

a digital imaging module, received within said docking portal, for automatically projecting a field of view (FOV) through said vertical scanning window, and capturing and processing one or more digital images of an object present in said FOV;

a digital image processor for processing said one or more digital images produced by said digital imaging subsystem in effort to read a symbol on each object passed through said FOV, and generate symbol character data representative of symbols read by said digital image processor;

an input/output subsystem, for receiving symbol character data from said scan data processor and said digital image processor, and transmitting said symbol character data to a host system operably connected to said input/output system; and a system controller for controlling the operation of said laser scanning subsystem and said digital imaging subsystem during said hybrid laser scanning and digital imaging mode of operation;

wherein said digital imaging module has a hand-supportable module housing provided with a first data/power/control interface circuit;

wherein said docking portal comprises a second data/power/control interface circuit so that an interface is established between said first and second data/power/control interface circuits when said digital imaging module is received within said docking portal; and wherein said digital imaging module can be removed from said docking portal and operated in a portable digital imaging mode of operation so as to read symbols on objects, generate symbol character data representative of read symbols, and transmit said symbol character data to said input/output subsystem.

20. The hybrid-type bi-optical symbol reading system of claim 19, comprising an automatic wake-up detector for detecting the presence of an operator in proximity of said system housing;

wherein, when said automatic wake-up detector detects the presence of said operator, said system controller activates said laser scanning subsystem.

* * * * *